(12) United States Patent
Bae et al.

(10) Patent No.: US 10,142,891 B2
(45) Date of Patent: Nov. 27, 2018

(54) COMMUNICATION METHOD USING PLURALITY OF NETWORKS AND DEVICE SUPPORTING THE SAME

(71) Applicant: Samsung Electronics Co., Ltd., Suwon-si, Gyeonggi-do (KR)

(72) Inventors: Yun Gyu Bae, Suwon-si (KR); Hye Jeong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 14/830,186

(22) Filed: Aug. 19, 2015

(65) Prior Publication Data

US 2016/0066220 A1   Mar. 3, 2016

(30) Foreign Application Priority Data

Aug. 26, 2014 (KR) .................. 10-2014-0111870

(51) Int. Cl.
*H04W 4/00* (2018.01)
*H04W 36/00* (2009.01)
*H04W 88/06* (2009.01)

(52) U.S. Cl.
CPC ... *H04W 36/0022* (2013.01); *H04W 36/0083* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 9,872,186 B2 | 1/2018 | Wu | |
| 2010/0329243 A1* | 12/2010 | Buckley | H04W 48/18 370/352 |
| 2011/0188451 A1* | 8/2011 | Song | H04W 36/0033 370/328 |
| 2012/0069823 A1* | 3/2012 | Low | H04W 4/00 370/335 |
| 2013/0083777 A1* | 4/2013 | Rydnell | H04W 36/0022 370/331 |
| 2013/0150052 A1* | 6/2013 | Zisimopoulos | H04W 48/18 455/437 |
| 2013/0188601 A1* | 7/2013 | Sun | H04W 36/14 370/331 |
| 2013/0272194 A1 | 10/2013 | Keller et al. | |
| 2013/0336127 A1 | 12/2013 | Wu | |

(Continued)

FOREIGN PATENT DOCUMENTS

CN   103874239 A   6/2014
EP   2 696 623 A1   2/2014

*Primary Examiner* — Otis L Thompson, Jr.
(74) *Attorney, Agent, or Firm* — Jefferson IP Law, LLP

(57) ABSTRACT

A communication method of an electronic device is provided. The method includes receiving, by a first communication module supporting a first network, a measurement message for a second network, providing the received measurement message to a second communication module supporting the second network, providing, by the second communication module, information on the second network to the first communication module in response to the measurement message, and reporting, by the first communication module, the information to the first network in order for a handover to the second network.

21 Claims, 10 Drawing Sheets

(56) References Cited

U.S. PATENT DOCUMENTS

| | | | |
|---|---|---|---|
| 2014/0071951 A1* | 3/2014 | Liu | H04W 52/0254 370/332 |
| 2014/0098787 A1* | 4/2014 | Kim | H04W 36/0022 370/331 |
| 2014/0133455 A1* | 5/2014 | Hallenstal | H04L 65/1016 370/331 |
| 2014/0140287 A1* | 5/2014 | Cheng | H04W 76/02 370/329 |
| 2014/0176660 A1* | 6/2014 | Khay-Ibbat | H04W 36/30 348/14.02 |
| 2014/0200002 A1* | 7/2014 | Vangala | H04W 52/0254 455/436 |
| 2014/0204901 A1 | 7/2014 | Hedman et al. | |
| 2015/0119043 A1* | 4/2015 | Gopal | H04W 36/0061 455/437 |
| 2015/0131619 A1* | 5/2015 | Zhu | H04W 36/0022 370/332 |
| 2015/0281929 A1* | 10/2015 | Shih | H04W 4/22 455/404.1 |
| 2015/0327143 A1* | 11/2015 | Won | H04W 36/30 370/332 |
| 2015/0358477 A1* | 12/2015 | Jeong | H04M 15/56 370/259 |
| 2015/0382270 A1* | 12/2015 | Kordybach | H04W 36/14 370/331 |
| 2016/0100338 A1* | 4/2016 | Wu | H04W 36/0022 370/331 |
| 2017/0026882 A1* | 1/2017 | Centonza | H04W 24/02 |

* cited by examiner

COMMUNICATION METHOD USING PLURALITY OF NETWORKS AND DEVICE SUPPORTING THE SAME

CROSS-REFERENCE TO RELATED APPLICATION(S)

This application claims the benefit under 35 U.S.C. § 119(a) of a Korean patent application filed on Aug. 26, 2014 in the Korean Intellectual Property Office and assigned Serial number 10-2014-0111870, the entire disclosure of which is hereby incorporated by reference.

TECHNICAL FIELD

The present disclosure relates to a technique for improving a handover process in a user equipment (UE) using a wireless communication function and also efficiently using a network resource.

BACKGROUND

A fourth generation (4G), for example, a long term evolution (LTE), communication method uses a packet-switched (PS) method and does not support a circuit-switched (CS) method. Accordingly, in order to provide a voice call function in an LTE terminal, a packet based voice communication, for example, voice over LTE (VoLTE), is used or a network (e.g., third generation (3G) network or second generation (2G) network) supporting a packet based voice communication is required.

For example, a terminal may provide both data service and voice service by using a radio frequency (RF) for LTE and an RF module for 2G/3G. In order to support such services, a communication technique such as simultaneous voice & LTE (SVLTE) or simultaneous global system for mobile communications (GSM) & LTE (SGLTE) may be applied to a terminal.

In relation to another method, a terminal may support voice/data services through one RF module by using a circuit switched fall back (CSFB) technique. For example, when there is an incoming call or a user makes a call, a terminal using an LTE communication network (e.g., a PS network) may connect a voice communication (and connect a data communication in 3G) as switching from an LTE network to a CS network in order for voice communication.

In general a CSFB method is a method for supporting voice communication when an LTE network does not support VoLTE. Moreover, when an LTE network supports VoLTE, a single radio voice call continuity (SRVCC) technique may be applied in order to hand over a voice call using VoLTE to a CS network (e.g., 2G/3G).

SRVCC, as may be inferred by the name, may maintain a voice call continuously by using single radio. If a terminal in a phone call using VoLTE moves to a place where no VoLTE is supported or the reception intensity of a signal is weaken, the terminal may perform cell searching for handover.

However, such cell searching takes a time for gap measurement procedure especially when single radio is used. For example, a terminal performs a measurement (e.g., GSM frequency) on a target cell during a current gap measurement time. Additionally, even if an LTE network becomes available after an SRVCC operation is completed or an LTE network becomes available during a call, a terminal may not maintain LTE service and, when a target cell does not support a multi radio access bearer, the terminal may not use data service during a voice call.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and device for improving a handover process through dual radio and also resuming data service of a packet-switched (PS) network after handover (for example, from a voice over long term evolution (VoLTE) call to a circuit-switched (CS) call).

In accordance with an aspect of the present disclosure, a communication method of an electronic device is provided. The method includes receiving, by a first communication module supporting a first network, a measurement message for a second network, providing the received measurement message to a second communication module supporting the second network, providing, by the second communication module, information on the second network to the first communication module in response to the measurement message, and reporting, by the first communication module, the information to the first network in order for a handover to the second network.

In accordance with an aspect of the present disclosure, an electronic device supporting a plurality of networks is provided. The electronic device includes a first communication module configured to receive a measurement message for a second network from a first network, and a second communication module configured to provide information on the second network to the first communication module in response to the measurement message provided from the first communication module. The first communication module reports the information to the first network.

In accordance with an aspect of the present disclosure, a communication method of an electronic device using a call service through a call session formed in a first stack is provided. The method including receiving, by the first stack, a second generation (2G) or third generation (3G) network information request message from a long-term evolution (LTE) network, delivering the request message to a second stack, providing, by the second stack, the 2G or 3G network information to the first stack, handing over the LTE network to the 2G or 3G network, and moving the call session from the first stack to the second stack.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
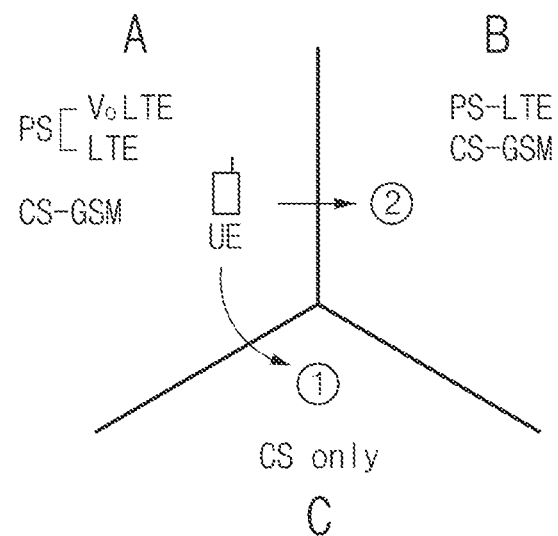
FIG. 1 is a view illustrating a network environment change of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. The expressions may be used to distinguish one element from another element. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (e.g., a first component) is referred to as being "(operatively or communicatively) coupled with/to" or "connected to" another component (e.g., a second component), the component may be directly connected to the other component or connected through another component (e.g., a third component).

In various embodiments of the present disclosure, it will be understood that when a component (e.g., a first component) is referred to as being "directly connected to" or "directly access" another component (e.g., a second component), another component (e.g., a third component) does not exist between the component (e.g., the first component) and the other component (e.g., the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (e.g., an embedded processor) for performing a corresponding operation or a generic-purpose processor (e.g., a central processing unit (CPU) or application processor (AP)) for performing corresponding operations by executing at least one software program stored in a memory device.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop PCs, laptop PCs, netbook computers, workstation server, personal digital assistants (PDAs), portable multimedia player (PMPs), a moving picture experts group (MPEG_1 or MPEG-2) audio layer III (MP3) players, mobile medical devices, cameras, and wearable devices (e.g., smart glasses, head-mounted-devices (HMDs), electronic apparel, electronic bracelets, electronic necklaces, electronic appcessories, electronic tattoos, smart mirrors, and smart watches).

According to various embodiments of the present disclosure, an electronic device may be smart home appliances. The smart home appliances may include at least one of, for example, televisions (TVs), digital video disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (e.g., Xbox™ and PlayStation™), electronic dictionaries, electronic keys, camcorders, and electronic picture frames.

According to various embodiments of the present disclosure, an electronic device may include at least one of various medical devices supporting call forwarding service (e.g., various portable measurement devices (e.g., glucometers, heart rate meters, blood pressure meters, temperature meters, and the like), magnetic resonance angiography (MRA) devices, magnetic resonance imaging (MRI) devices, computed tomography (CT) devices, medical imaging devices, ultrasonic devices, and the like), navigation devices, global positioning system (GPS) receivers, event data recorders (EDRs), flight data recorders (FDRs), vehicle infotainment devices, marine electronic equipment (e.g., marine navigation systems, gyro compasses, and the like), avionics, security equipment, vehicle head units, industrial or household robots, financial institutions' automatic teller's machines (ATMs), or stores' point of sales (POS) or internet of things (e.g., bulbs, various sensors, electric or gas meters, sprinkler systems, fire alarms, thermostats, street lights, toasters, exercise equipment, hot water tanks, heaters, boilers, and the like).

In various embodiments of the present disclosure, an electronic device may include at least one of part of furniture or buildings/structures supporting call forwarding service, electronic boards, electronic signature receiving devices, projectors, and various measuring instruments (e.g., water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to advancing technology development.

Hereinafter, an electronic device according to various embodiments of the present disclosure will be described in more detail with reference to the accompanying drawings. The term "user" in this disclosure may refer to a person using an electronic device or a device using an electronic device (e.g., an artificial intelligent electronic device).

FIG. 1 is a view illustrating a network environment change of an electronic device according to various embodiments of the present disclosure.

Referring to FIG. 1, an electronic device such as a user equipment (UE) supporting a mobile communication function may be in a variety of network environments. For example, an electronic device may be in a long term evolution (LTE) network environment A where voice over LTE (VoLTE) is built. At this point, the network environment A may support a second generation (2G)/third generation (3G) circuit-switched (CS) network. Additionally, an electronic device may be in a network environment B supporting LTE but not supporting VoLTE. At this point, the network environment B may support a 2G/3G CS network. Additionally, an electronic device may be a network environment C not supporting LTE but supporting only a CS network (e.g., supporting only a 3G/2G or 2G network) In general an LTE network has less coverage than a 2G/3G network. Additionally, VoLTE is supported only in a part of an area supporting an LTE network.

As shown in FIG. 1, when a call using VoLTE starts with a UE in the network environment A, the UE may maintain the call using VoLTE. Additionally, the UE may continuously use data service through a packet-switched (PS) network. In this state, if the network environment of the UE changes from a state A to state C (see ①), since the network environment C does not support LTE and also a voice call service using a PS network, a call using VoLTE may be handed over to a voice call using a CS network (e.g., single radio voice call continuity (SRVCC)). This situation includes a case where the LTE service is unavailable or limited due to an LTE shadow area in an area supporting LTE in addition to a case that a UE moves to a cell area not supporting LTE.

If the UE during a VoLTE call changes from the network environment A to the network environment B (see ②), since the network environment B supports an LTE network but does not support a voice call service using an LTE network, the VoLTE call is terminated or may be handed over to a voice call using a CS network in the network environment C (e.g., SRVCC). This situation includes a case that VoLTE service is provided selectively because a sufficient resource for supporting VoLTE is not obtained due to the reason that a plurality of UEs are positioned in the same cell in an area supporting VoLTE or VoLTE service is not smooth due to various reasons in addition to a case that a UE moves to a cell area supporting LTE but not supporting VoLTE.

On the other hand, when a dual radio terminal is in the network environment B, if the UE receives or transmits a voice call, the UE may start a voice call through a CS network and provide PS data service through an LTE network at the same time.

According to various embodiments of the present disclosure, when the network environment of the UE is changed, the UE may reduce a handover time by using a plurality of cellular modules supporting a network environment before the change and the network environment that is a target to be changed. Additionally, according to various embodiments of the present disclosure, when the UE using both a VoLTE call and data transmission/reception service simultaneously changes from the network environment A to the network environment B, the UE terminates an LTE network connection and moves the call session from VoLTE to CS through an SRVCC process, and connects an LTE network again to resume data service. At this point, LTE data is suspended in a network during the SRVCC process and when the terminal accesses an LTE network again, resumes. Additionally, according to various embodiments of the present disclosure, when the UE during a VoLTE call enters from the network environment A into the network environment C and performs SRVCC and then, enters the network environment A or B, the UE provides data service by connecting an LTE network again.

Hereinafter, a configuration of an electronic device (e.g., the UE) including a plurality of cellular modules will be described with reference to FIG. 2.

Figure 2:
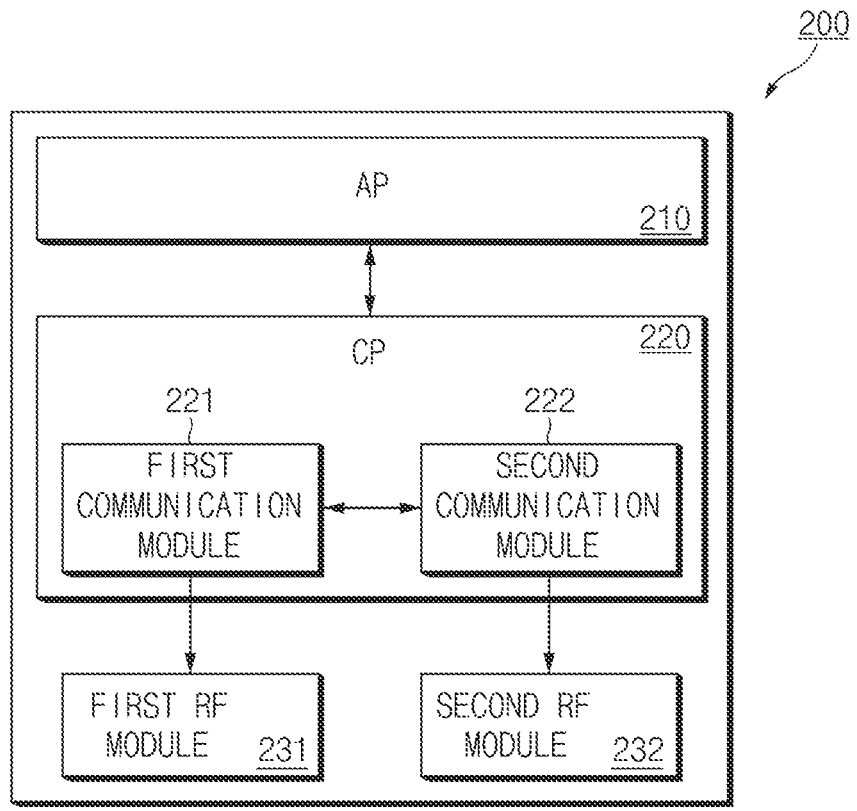
FIG. 2 is a block diagram illustrating a configuration of an electronic device supporting handover and data service resume according to various embodiments of the present disclosure.

FIG. 2 is a block diagram illustrating a configuration of an electronic device supporting handover and data service resume according to various embodiments of the present disclosure.

Referring to FIG. 2, according to various embodiments of the present disclosure, an electronic device 200 may include an AP 210, a communication processor (CP) 220, a first radio frequency (RF) module 231, and a second RF module 232. For example, the first RF module 231 may support at least one of radio access technologies (RATs) such as LTE, time-division synchronous code division multiple access (TD-SCDMA), wideband CDMA (WCDMA), and global system for mobile communications (GSM). For example, the first RF module 231 may support RATs such as LTE and GSM. Additionally, the first RF module 231 may be connected to at least one antenna for transmitting/receiving signals using the RAT. For example, the at least one antenna may include a transmission/reception antenna and a diversity antenna. Additionally, the first RF module 231 may include a transceiver supporting signal transmission/reception through the antenna, a front-end module (FEM), and an amplifier (e.g., a low noise amplifier (LNA)).

Similarly, the second RF module 232 may support an RAT (e.g., GSM enhanced data rates for GSM evolution (EDGE) Radio Access Network (GERAN), GSM, and the like) supporting at least one CS network. Additionally, the second RF module 232 may be connected to an antenna for transmitting/receiving signals using an RAT supporting a CS network. Additionally, the second RF module 232 may include a transceiver supporting signal transmission/reception through the antenna, a FEM, and an amplifier (e.g., an LNA).

The CP 220 may include a first communication module 221 connected to the first RF module 231 and a second communication module 222 connected to the second RF module 232. Additionally, the first communication module 221 and the second communication module 222 may exchange a request and a response for network information.

The first communication module 221 may include a first stack for supporting a first network (e.g., an LTE network) using the first RF module 231. The second communication module 222 may include a second stack for supporting a second network (e.g., a 2G or 3G network) using the second RF module 232. Each stack may include information of the network currently using the service. For example, while using the first network by using the first stack (e.g., while using LTE service), the second stack may obtain information on the second network (e.g., a 2G or 3G network) in advance and may retain the information.

According to various embodiments of the present disclosure, when the first stack requests information on the second network from the second stack, the second stack may provide pre-owned information to the first stack.

According to various embodiments of the present disclosure described below, the first communication module 221 and the second communication module 222, which are not identified specifically, may be understood as a first stack and a second stack, respectively, and operations performed in the first stack and the second stack may be understood as operations performed in the first communication module 221 and the second communication module 222. Additionally, the first stack may be also mentioned as a main stack, and the second stack may be also mentioned as a hybrid stack or a sub stack. This is expression for convenience of description or various embodiments and which module performs each operation should be understood based on a function that each operation performs.

The electronic device 200 shown in FIG. 2 is for describing an operation of the present disclosure and an electronic device for implementing the actual present disclosure may have various modified or additional configurations. For example, the CP 220 according to various embodiments of the present disclosure includes one cellular module and the first stack and the second stack may be disposed in the one cellular module. In this case, the first stack and the second stack may be mutually connected to each other to request and respond information on a network.

Additionally, according to various embodiments of the present disclosure, the AP 210 and the second CP 220 may be implemented in the form of one integrated chip, for example, a system on chip (SoC).

Additionally, according to various embodiments of the present disclosure, the CP 220 of the electronic device 200 may include a module for various wireless communications such as a WiFi module in addition to a cellular module. Additionally, the electronic device 200 may include an additional configuration such as a display or a sensor module in addition to the configuration of FIG. 2. The electronic device 200, for example, may have various extensions and modifications like the electronic device 301 of FIG. 3 or the electronic device 901 of FIG. 9. Hereinafter, in relation to a configuration and network environment of a processor, modifications of the electronic device 200 are described with reference FIG. 3 and general extensions of the electronic device 200 are described later with reference to FIG. 9.

Figure 3:
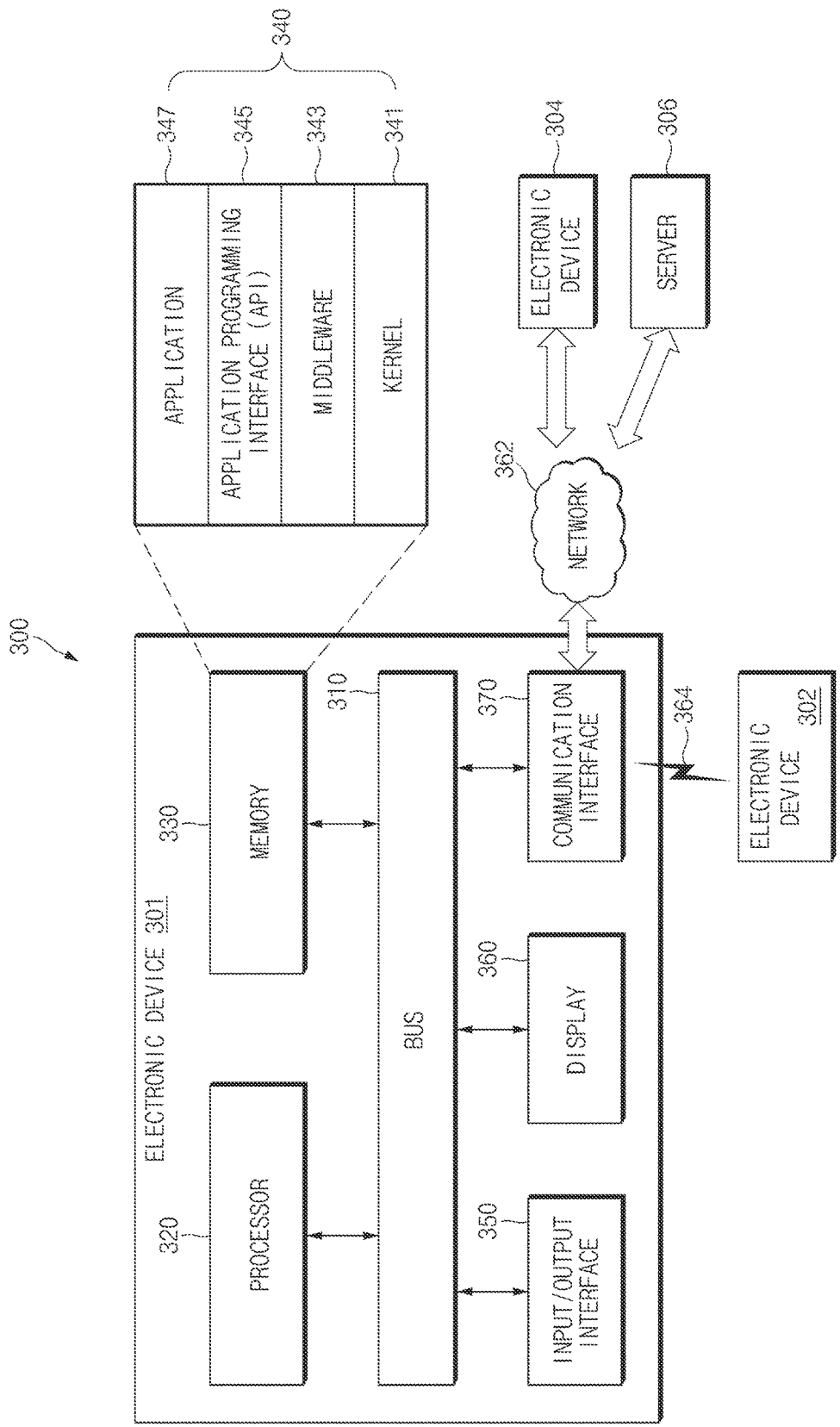
FIG. 3 is a view illustrating an electronic device in a network environment according to various embodiments of the present disclosure.

FIG. 3 is a view illustrating an electronic device in a network environment according to various embodiments of the present disclosure.

Referring to FIG. 3, an electronic device 301 in a network environment 300 is described according to various embodiments of the present disclosure. The electronic device 301 may include a bus 310, a processor 320, a memory 330, an input/output interface 350, a display 360, and a communication interface 370.

According to an embodiment of the present disclosure, the electronic device 301 may omit at least one of the components or may additionally include a different component.

The bus 310, for example, may include a circuit for connecting the components 310 to 370 to each other and delivering a communication (e.g., control message and/or data) between the components 310 to 370.

The processor 320 may include at least one of a CPU, an AP, and a CP. The processor 320, for example, may execute calculation or data processing for control and/or communication of at least one another component of the electronic device 301. For example, the processor 320 may correspond to the AP 210, the CP 220, or both.

The memory 330 may include volatile and/or nonvolatile memory. The memory 330, for example, may store instructions or data relating to at least one another component of the electronic device 301.

According to an embodiment of the present disclosure, the memory 330 may store software and/or program 340. The programs 340, for example, may include a kernel 341, a middleware 343, an application programming interface (API) 345, and/or an application program (or an application) 347. At least part of the kernel 341, the middleware 343, or the API 345 may be called an operating system (OS).

The kernel 341, for example, may control or manage system resources (e.g., the bus 310, the processor 320, the memory 330, and the like) used for performing operations or functions implemented in other programs (e.g., the middleware 343, the API 345, or the application program 347). Additionally, the kernel 341 may provide an interface for controlling or managing system resources by accessing an individual component of the electronic device 301 from the middleware 343, the API 345, or the application program 347.

The middleware 343, for example, may serve as an intermediary role for exchanging data as the API 345 or the application program 347 communicates with the kernel 341.

Additionally, in relation to job requests received from the application program 347, the middleware 343, for example, may perform a control (e.g., scheduling or load balancing) for the job requests by using a method of assigning a priority for using a system resource (e.g., the bus 310, the processor 320, the memory 330, and the like) of the electronic device 301 to at least one application program among the application programs 347.

The API 345, as an interface for allowing the application 347 to control a function provided from the kernel 341 or the middleware 343, may include at least one interface or function (e.g., an instruction) for file control, window control, image processing, or character control.

The input/output interface 350, for example, may serve as an interface for delivering instructions or data inputted from a user or another external device to another component(s) of the electronic device 301. Additionally, the input/output interface 350 may output instructions or data received from another component(s) of the electronic device 301 to a user or another external device.

The display 360, for example, may include a liquid crystal display (LCD), a light emitting diode (LED) display, an organic LED (OLED) display, a microelectromechanical systems (MEMS) display, or an electronic paper display. The display 360 may display various content (e.g., text, image, video, icon, symbol, and the like) to a user. The display 360 may include a touch screen, and for example, may receive a touch, gesture, proximity, or hovering input by using an electronic pen or a user's body part.

The communication interface 370, for example, may set a communication between the electronic device 301 and an external device (e.g., a first external electronic device 302, a second external electronic device 304, or the server 306). For example, the communication interface 370 may communicate with an external device (e.g., the second external electronic device 304 or the server 306) in connection to the network 362 through wireless communication or wired communication. As described with reference to FIG. 1, a wireless communication network among the networks 362 may include at least one of a PS network supporting LTE, a PS network supporting LTE and VoLTE, and a CS network supporting GSM.

The wireless communication may use at least one of LTE, LTE-advanced (LTE-A), CDMA, WCDMA, universal mobile telecommunications system (UMTS), wireless broadband (WiBro), or GSM, each of which uses a PS network or a CS network, as a cellular communication protocol. The wired communication, for example, may include at least one of universal serial bus (USB), high definition multimedia interface (HDMI), recommended standard 232 (RS-232), and plain old telephone service (POTS). The network 362 may include telecommunications network, for example, at least one of computer network (e.g., local area network (LAN) or wide area network (WAN)), internet, and telephone network.

Each of the first and second external electronic devices 302 and 304 may be the same or different type of the electronic device 301.

According to an embodiment of the present disclosure, the server 306 may include a group of one or more servers.

According to various embodiments of the present disclosure, all or part of operations executed on the electronic device 301 may be executed on another one or more electronic devices (e.g., the electronic device 302 or 304 or the server 306).

According to an embodiment of the present disclosure, when the electronic device 301 performs a certain function or service automatically or by a request, the electronic device 301 may request at least part of a function relating thereto from another device (e.g., the external electronic device 302 or 304 or the server 306) instead of or in addition to executing the function or service by itself. The other electronic devices (e.g., the external electronic device 302 or 304 or the server 306) may execute the requested function or an additional function and may deliver an execution result to the electronic device 301. The electronic device 301 may provide the requested function or service by processing the received result as the received result is or additionally. For this, for example, cloud computing, distributed computing, or client-server computing technology may be used.

Hereinafter, a network handover processor when a call environment is changed in the above-mentioned electronic device 200 (or the electronic device 301) is described.

Figure 4:
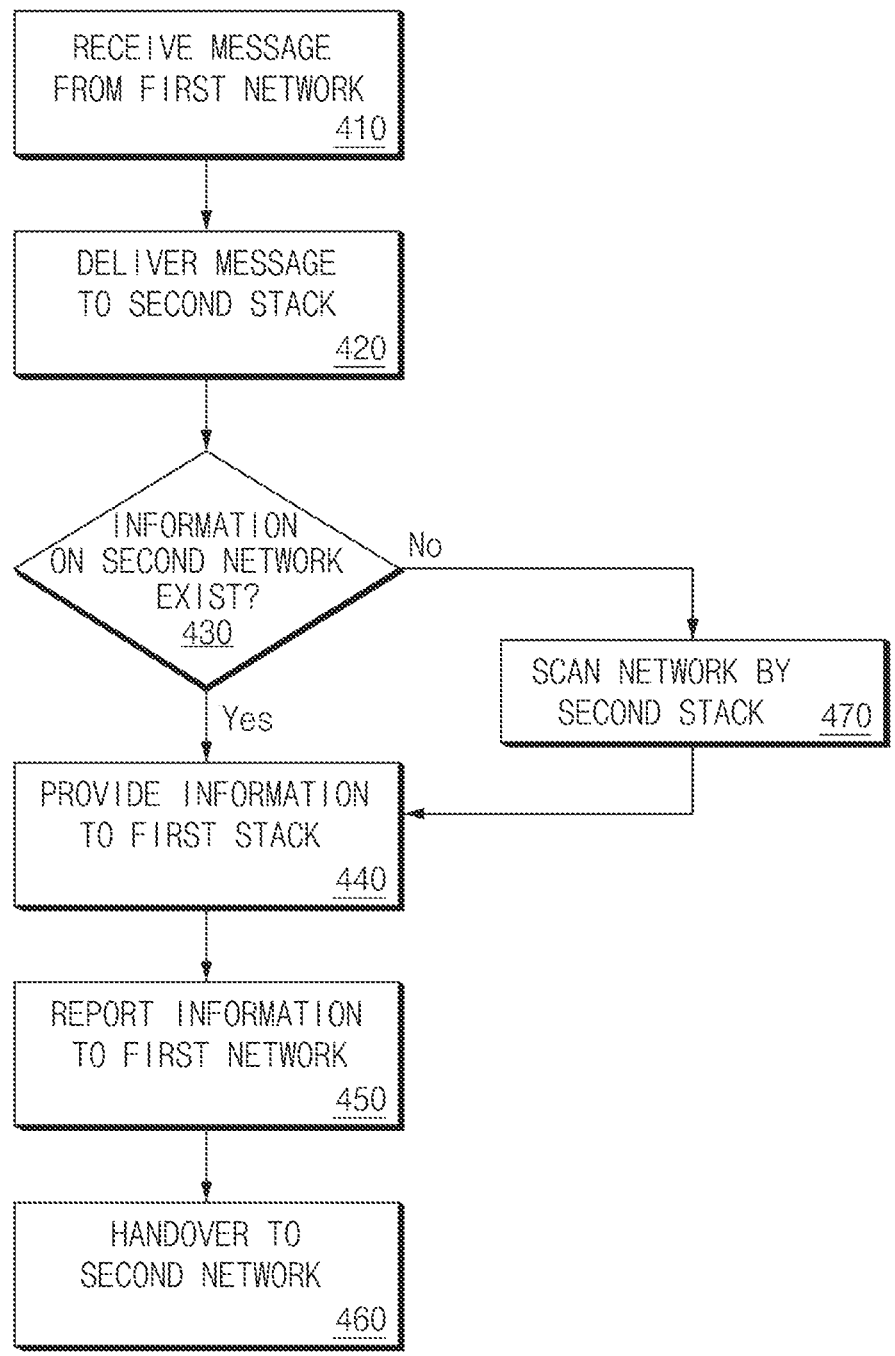
FIG. 4 is a flowchart illustrating a handover process according to various embodiments of the present disclosure.

FIG. 4 is a flowchart illustrating a handover process according to various embodiments of the present disclosure.

Referring to FIG. 4, the first communication module 221 of the electronic device 200 may receive a message including measurement information on a second network cell through the first RF module 232 in operation 410. This message may be processed in the first stack. For example, the electronic device 200 may be in a call state using VoLTE in the first network. Now, when it is impossible to continue a VoLTE call due to several reasons such as when the electronic device 200 moves to a cell not supporting VoLTE or an LTE shadow area or when VoLTE service is allowed limitedly as the number of users increases in the same cell (e.g., a serving cell), the electronic device 200 (e.g., the first RF module 231) may receive a message (e.g., a measure config message) for obtaining peripheral network information with inter-RAT (IRAT) information (e.g., GSM) in order to be handed over from the first network to another network.

According to various embodiments of the present disclosure, the message may be an IRAT measure config message or a radio resource control (RRC) connection reconfiguration message. Such a message may request that a signal intensity with respect to the current electronic device 200, which satisfies a specific condition in specific RAT and frequency band, is obtained and reported to a network (e.g., the first network).

In operation 420, the first stack of the electronic device 200 may deliver a message received from the first network to the second communication module 222. For example, the first stack may provide the message content to the second stack (e.g., measurement configuration, an IRAT cell list, frequency information, and the like) or may request, from the second stack, information necessary for a message (e.g., a list of cells satisfying a measurement report condition and a measurement result). Before operation 420, the second stack may be in a state of searching for a serving cell and a surrounding cell in the second network and performing measurement periodically or if necessary, while attaching to the second network and maintaining the connection. Alternatively, the second stack may be in a state of performing a cell search and measurement of the second network periodically or through another method without attaching to the second network.

In operation 430, the electronic device 200 may determine whether the second stack has information on the second network. This operation may include an operation for determining whether information that the second stack has is recently specified valid information (e.g., information measured within a specified time (several ms)). For example, the message may include a network resource (e.g., cells and frequency) necessary for continuously providing a call service using VoLTE (e.g., PS) through a CS network. The second stack may determine whether information corresponding to the network resource is included in information obtained in advance and, if the information is included, whether the information is valid or not.

When the second stack already retains information that the first network requests for handover, the electronic device 200 may perform operation 440. That is, the second stack (e.g., the second communication module 222) may provide information on the second network to the first communication module 221 in response to the message in operation 440. If the second stack does not retain information on the second network or retained information is not valid, the electronic device 200 may perform operation 470. That is, the second stack may scan information on the second network by using the second RF module 232 in operation 470. When handover available network information is obtained as the scanning is completed, the second stack may provide the obtained network information to the first stack.

In operation 450, the electronic device 200 may report to the first network the information obtained in operation 440 in response to the message received in operation 410.

In operation 460, the electronic device 200 may be handed over to the second network. Operation 460 may include an operation for receiving a handover command from the first network and an operation for transmitting a message that the handover to the second network is completed. Once operation 460 is completed, for example, a call service using VoLTE may be handed over to a call service using CS.

The handover process described with reference to FIG. 4 may have many advantages in terms of a time consumed for handover and the use of a wireless resource in comparison to the SRVCC handover of an existing circuit switched fall back (CSFB) terminal. For example, the technique "GAP measurement" is used in order to hand over VoLTE to GSM in the CSFB based SRVCC. The GAP is allocated by an LTE network and LTE data scheduling is not performed during an allocated time. The terminal may perform cell search and measurement on another frequency or another RAT during an allocated time. For example, an LTE Network allocates a 6 msec GAP periodically (e.g., 40 msec or 80 msec). A CSFB terminal performs IRAT measurement during a VoLTE call by using a GAP section that a base station allocates. Since a GAP section is short, several GAPs are required and as the number of frequencies or cells to be measured is larger, a measurement time becomes longer (e.g., 1 sec). In this case, a measurement report timing is delayed and as a result, an SRVCC handover timing is delayed However, according to various embodiments of the present disclosure, when a message for handover is received from the current network, the electronic device 200 may immediately report a measurement report by using information that the second stack has. Accordingly, the above-mentioned delay (e.g., 1 sec) may be reduced.

According to various embodiments of the present disclosure, the UE transmits an SRVCC related measurement report relatively faster so that a handover time may be reduced.

According to various embodiments of the present disclosure, the second stack may retain available information in advance in a measurement report for a surrounding cell (e.g., a serving cell and the six strongest neighbor cells) while performing an idle procedure.

According to various embodiments of the present disclosure, if information of a target network required to obtain information and information that the second stack retains have a common portion, an electronic device may report a measurement result to the first network by using corresponding information. However, if there is no common portion or a common portion cannot be used (e.g., when a valid measurement time elapses, when a received signal strength indicator (RSSI) is below a specified standard, and the like), the electronic device 200 may perform a measurement task on a necessary frequency and cell by using the second stack and may report its result to the first network.

In various embodiments of the present disclosure, when the second stack cannot perform a measurement task or when information acquisition for a target network that a message requests by using the second stack is failed (e.g., information acquisition is failed in operation 460), the electronic device 200 may perform scanning on the message based target network by using the first stack. In this case, since the first stack is providing a service of the first network, the electronic device 200 may use the above-mentioned GAP measurement method.

Figure 5:
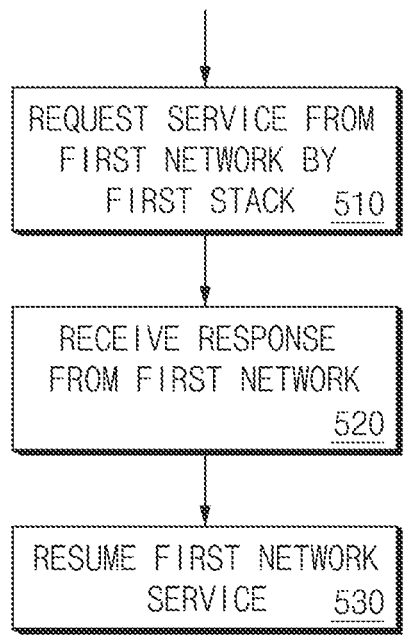
FIG. 5 is a flowchart illustrating a process for resuming data service after handover according to various embodiments of the present disclosure.

FIG. 5 is a flowchart illustrating a process for resuming data service after handover according to various embodiments of the present disclosure.

According to various embodiments of the present disclosure, the electronic device 200 may move from an LTE network area supporting VoLTE to an LTE network area not supporting VoLTE. In this case, in order to continue call service, an SRVCC handover to a 2G or 3G CS network may be performed through the process of FIG. 4. However, in a system using dual radio, even when CS service resumes by the second communication module 222 through a 2G or 3G network, a data service using the first communication module 221 and the first RF module 231 may be supported. In general, since a data service provided from an LTE network is more efficient in speed or bandwidth in comparison to a data service provided from a 2G or 3G network, the process of FIG. 5 may increase the efficiency of a wireless resource.

Referring to FIG. 5, in operation 510, the UE may transmit a request for resuming data service (e.g., a tracking area update (TAU) request) from the first communication module 221 (or the first stack) to the first network through the first RF module 231. When a target network does not support CS voice and PS data at the same time during SRVCC handover, PS data service is suspended and when the UE accesses an LTE network again and transmits an NAS message, the PS data service is resumed. After the CS voice call termination, although an existing CSFB terminal resumes data service by accessing an LTE network, if an LTE network is available during a voice call after SRVCC handover, the UE may resume data service by accessing the LTE network.

According to various embodiments of the present disclosure, as checking that SRVCC handover is completed after the completion of SRVCC handover in a network stage, the UE may access an LTE network again. When the UE accesses an LTE network because of the completion of SRVCC handout but an LTE network does not receive the confirmation that the SRVCC hand is completed, the LTE Network may determine that the SRVCC handover is failed and may operate a handover cancellation procedure. To address such an issue, a UE may access an LTE network after checking whether SRVCC handover is completed on network.

According to an embodiment of the present disclosure, after checking whether RRC connection is released in an LTE network, the UE may access an LTE network. For example, after sending an RRC connection reestablishment request to an LTE network, if receiving a reject from the LTE network, a UE may determine that RRC connection is released.

According to another embodiment of the present disclosure, after a time sufficient for the completion of SRVCC handover in a network by driving a timer (or when a specified time elapses after confirming that SRVCC handover is completed), a UE may access an LTE network.

In operation 520, the UE may receive a response (e.g., TAU accept) for operation 510 from the first network through the first RF module 231.

In operation 530, the UE may resume data service on the basis of the received response. For example, the UE may resume data service by transmitting a predetermined message (e.g., TAU complete) through the first RF module 231.

Figure 6:
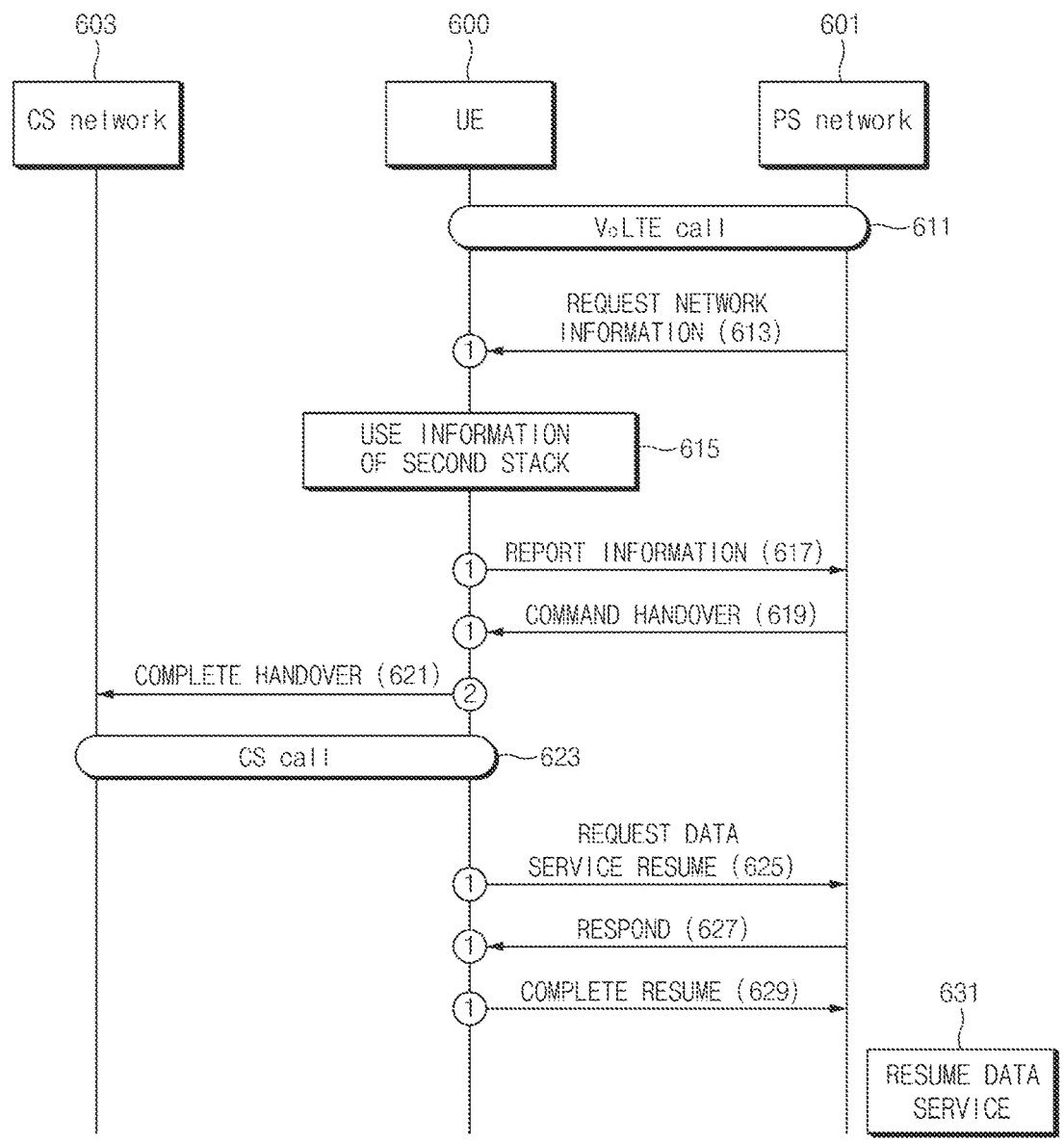
FIG. 6 is a ladder diagram illustrating a handover and data service resume process in a packet-switched (PS)-circuit-switched (CS) network of an electronic device using a first stack and a second stack therein according to various embodiments of the present disclosure.

FIG. 6 is a ladder diagram illustrating a handover and data service resume process between an electronic device using a first stack and a second stack therein and an LTE-CS network according to various embodiments of the present disclosure.

Referring to FIG. 6, a series of processes where the above-mentioned method is applied is illustrated. For example, the process shown in FIG. 6 may be exemplarily understood as a process in which a VoLTE call formed through a main stack (see ①) is handed over to a CS call through a hybrid stack (see ②) and LTE data service is used by using the main stack. Content identical, corresponding, or similar to the above-mentioned content may be omitted in the description below.

Referring to FIG. 6, a UE 600 may correspond to the electronic device 200 of FIG. 2. In operation 611, the UE 600 may form a VoLTE call through an LTE network 601.

When a VoLTE call cannot be maintained due to a change of various network environments, the UE 600 may receive a network information request message for handover in operation 613 (e.g., RRC connection reconfiguration message or IRAT measure config) from the LTE network 601. This operation may be performed in the main stack (e.g., the first stack).

In response to the request message, the UE 600 may report information on a CS network 603 (e.g., measurement report) to the LTE network 601 in operation 617 by using information on the hybrid stack (e.g., the second stack) in operation 615.

The UE 600 may receive a handover command from the LTE network 601 in operation 619 and transmit a handover complete message to the CS network 603 in operation 621 in order to perform handover from the LTE network 601 to the CS network 603. At this point, operation 621 may be performed in the hybrid stack. In operation 623, the UE 600 may form a CS call through the CS network 603. At this point, the electronic device 200 may move a call session from the main stack to the hybrid stack.

Once a CS call is formed, the UE 600 may transmit a data service resume request to the LTE network 601 in operation 625. Once a response for the resume request is received from the LTE network 601 in operation 627, the UE 600 transmits a resume completion message to the LTE network 601 in operation 629 and resumes data service in operation 631.

Figure 7:
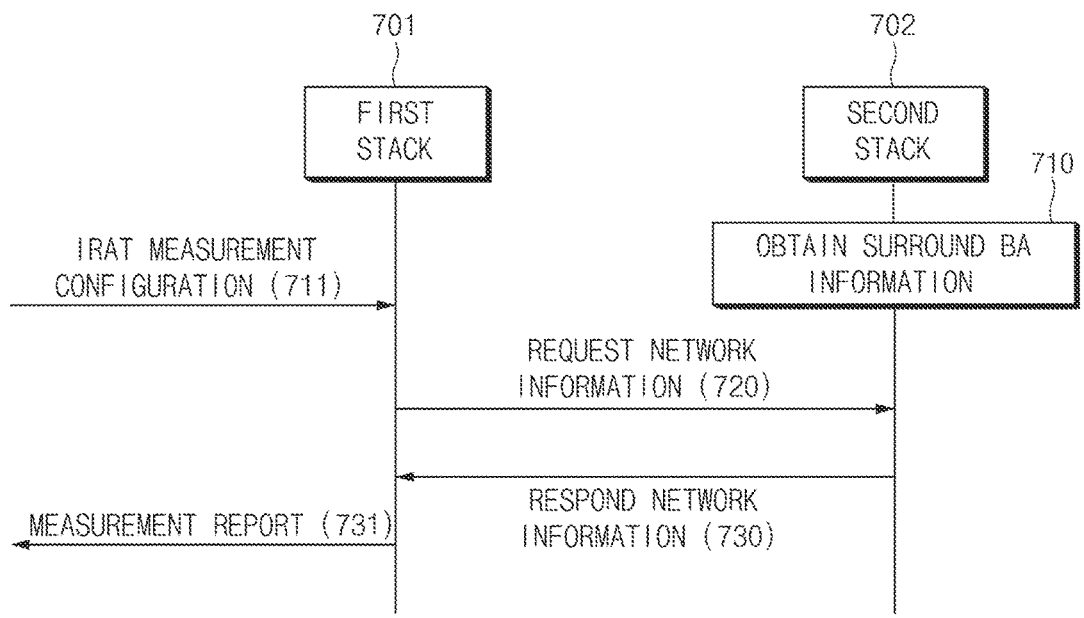
FIG. 7 is a ladder diagram illustrating a procedure performed between a first stack and a second stack according to various embodiments of the present disclosure.

FIG. 7 is a ladder diagram illustrating a procedure performed between a first stack and a second stack according to various embodiments of the present disclosure.

Referring to FIG. 7, an operation is performed between the main stack and the hybrid stack (e.g., a first stack 701 and a second stack 702) as in operation 615 of FIG. 6.

In operation 710, the second stack 702 may obtain information on a surrounding cell, for example, a serving cell and a neighbor cell. For example, the second stack 702 may obtain the information when an idle procedure is performed or may often obtain and retain information on a network supported by the second stack according to a change of a cell where the electronic device 200 is positioned or according to a network state change supported by the first stack 701.

In operation 711, a message including IRAT measurement configuration may be received by the first stack 701.

In operation 720, the first stack 701 may request network information based on the message by the second stack 702. In operation 730, the second stack 702 may respond with network information for the request by using the already retained information without performing an additional network search. This operation may be repeated when the measurement report of operation 731 is transmitted to a network connected to the first stack 701 and then a handover command is received or until a measurement configuration (e.g., a message config) of an SRVCC message is changed or deleted.

In operation 731, the first stack 701 may report network information by using information provided from the second stack 702. Operation 731 may correspond to operation 617 of FIG. 6, for example. A subsequent process may proceed to operation 623 according to a network environment (when only a CS network is supported), or operation 631 (when a PS network is supported also).

Figure 8:
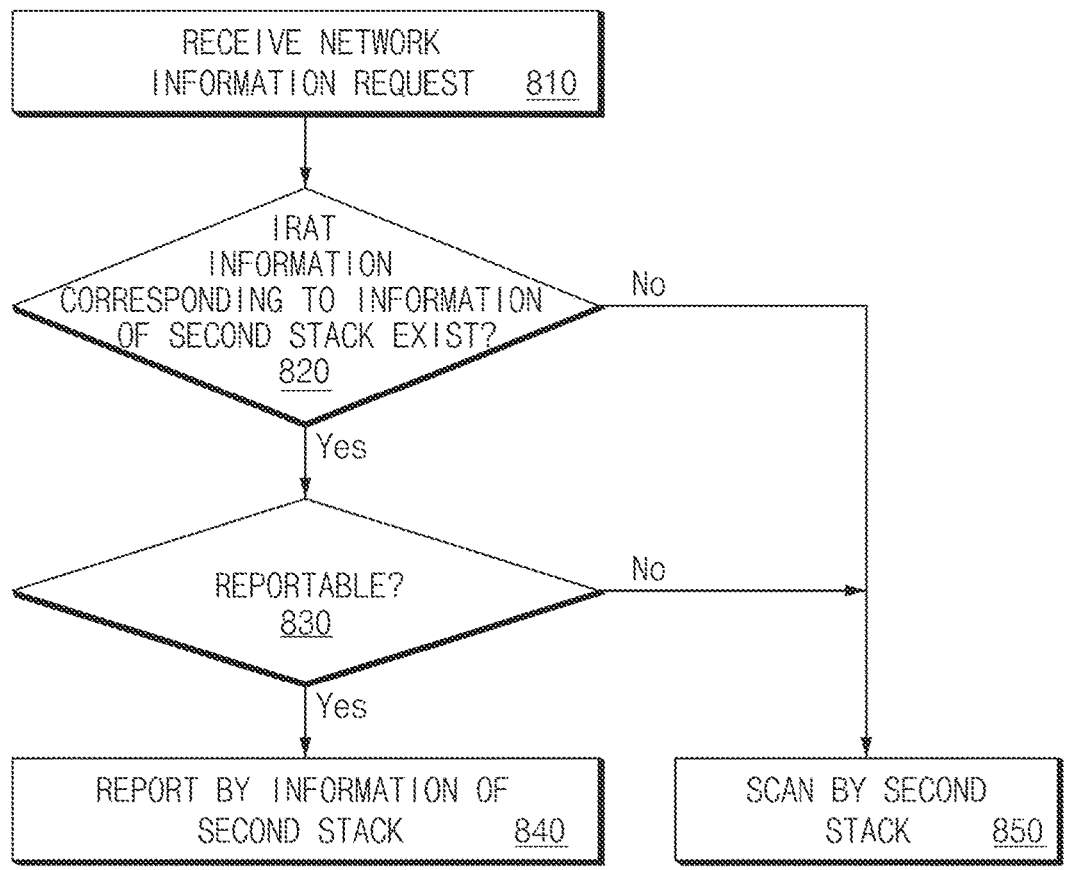
FIG. 8 is a view illustrating a network information report process according to various embodiments of the present disclosure.

FIG. 8 is a view illustrating a network information report process according to various embodiments of the present disclosure. The embodiment of FIG. 8 may be understood as an embodiment for providing information or performing a network scan operation by comparing information that the second communication module 222 retains and information requested from the first communication module 221 and then determining whether there is cross-matching information.

Referring to FIG. 8, in operation 810, the second communication module 222 may receive a network (e.g., the second network) information request for handover from the first network through the first communication module 221.

In operation 820, the second communication module 222 may compare a request message provided from the first communication module 221 and information on the second network that the second stack retains. For example, the second communication module 222 may determine whether the second stack retains network information satisfying the frequency band and signal intensity condition of IRAT included in the request message.

When the information that the second stack retains is identical to the IRAT information of the request message in operation 820, it is determined in operation 830 that corresponding information is reportable. For example, an electronic device may determine whether the corresponding information is network information measured within a valid time interval (e.g., 50 ms). Operation 830 may be selectively performed in the second communication module 222 or the first communication module 221.

If it is determined in operation 830 that the corresponding information is reportable, the electronic device 200 (e.g., the first communication module 221) may report a measurement result using the information of the second stack to the first network by using the first RF module 231 in operation 840.

If the second stack does not have information identical to the information included in the request message in operation 820 or it is determined in operation 830 that the corresponding information is not reportable, the electronic device 200 may measure network information by using the second stack in operation 850. However, according to various embodiments of the present disclosure, when network information measurement by using the second stack fails or due to various conditions of power management, the electronic device 200 may measure network information by using the first stack (e.g., by using a GAP measurement method).

A communication method of an electronic device according to various embodiments of the present disclosure may include receiving a measurement message for second network by a first communication module supporting a first network, providing the received message to a second communication module supporting the second network, providing, by the second communication module, information on the second network to the first communication module in response to the message, and reporting, by the first communication module, the information to the first network in order for handover to the second network.

According to various embodiments of the present disclosure, the first network may be a PS network and the second network may be a CS network.

According to various embodiments of the present disclosure, the providing of the information on the second network may include, when the second communication module has information on the second network, providing the information to the first communication module and when the second communication module does not have the information, measuring information on the second network by the second communication module. Additionally, if the second communication module does not have the second network information or the second communication module has difficulties in measuring the second network information, the first communication module may measure information on the second network through a gap measurement method.

According to various embodiments of the present disclosure, the method may further include at least one of when a handover to the second communication module is completed, transmitting, by the first communication module, a data service request message to the first network, receiving a response for the request message, and resuming the data service on the basis of the received response. Additionally, the transmitting of the data service request message may be set to be performed when the electronic device is in an area supporting LTE but not supporting VoLTE or in an area where VoLTE is supported but currently is not available.

Additionally, according to various embodiments of the present disclosure, the transmitting of the data service request message may be performed when the electronic device enters from a CS area to an LTE area, when the electronic device confirms that SRVCC is completed in the first network, or when a specified time elapses after the electronic device confirms that the SRVCC is completed.

A communication method of an electronic device using call service by using a call session formed in a first stack may include receiving, by a first stack, a 2G or 3G network information request message from an LTE network, delivering the request message to a second stack, providing the 2G or 3G network information from the second stack to the first stack, handing over the LTE Network to the 2G or 3G network, and moving the call session from the first stack to the second stack.

According to various embodiments of the present disclosure, the providing of the network information may include, when the second stack has information on the 2G or 3G network in advance, providing the information to the first stack, and when the second stack does not have information on the 2G or 3G network, measuring, by the second stack, information on the 2G or 3G network.

According to various embodiments of the present disclosure, the method may further include transmitting, by the first stack, a data service request message to the LTE network and resuming data service on the basis of a response for the request message.

Figure 9:
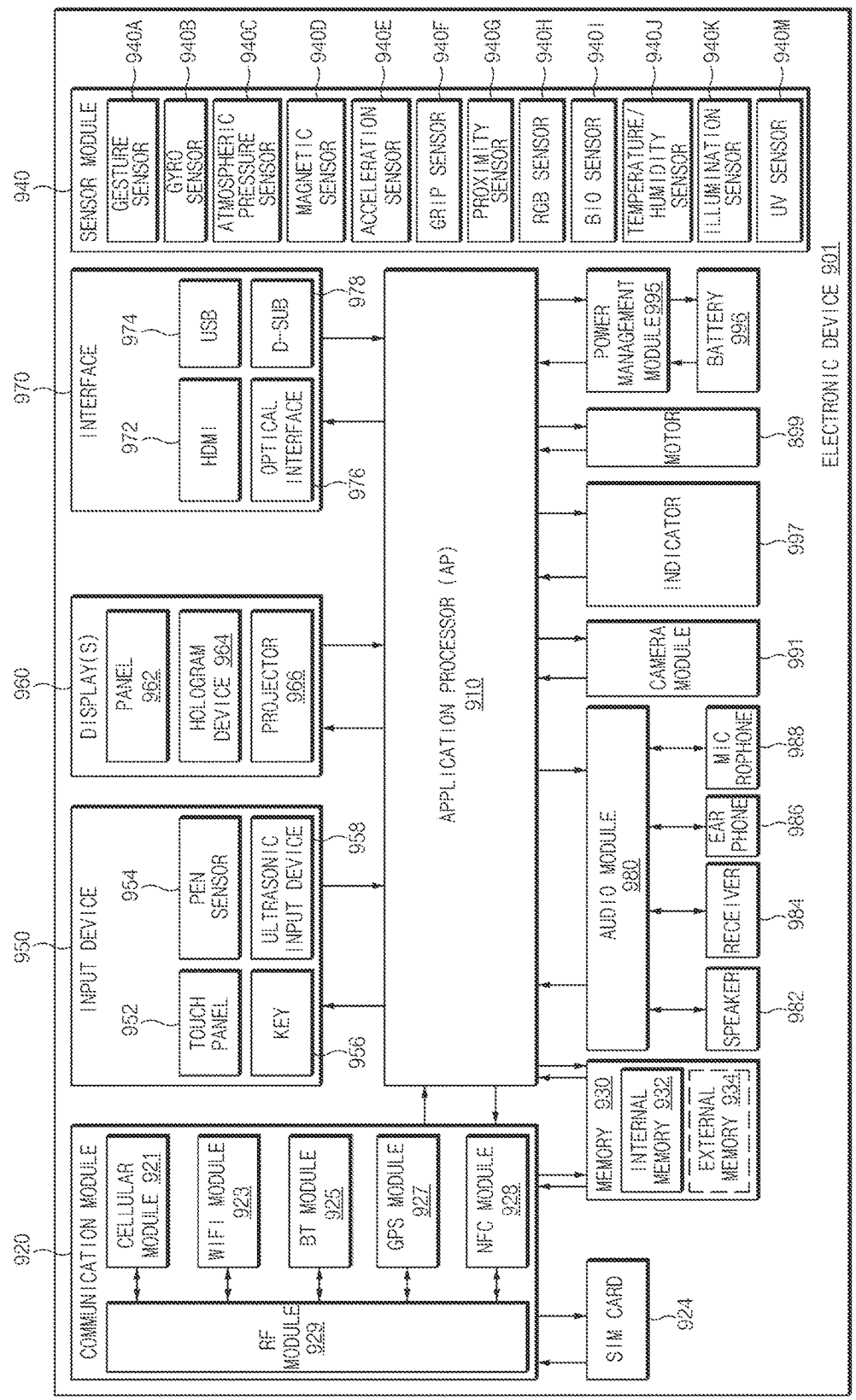
FIG. 9 is a block diagram of an electronic device according to various embodiments of the present disclosure.

FIG. 9 is a block diagram of an electronic device according to various embodiments of the present disclosure.

Referring to FIG. 9, an electronic device 901, for example, may configure all or part of the above-mentioned electronic device 301 shown in FIG. 3. The electronic device 901 may include AP 910, a communication module 920, a subscriber identification module (SIM) card 924, a memory 930, a sensor module 940, an input device 950, a display 960, an interface 970, an audio module 980, a camera module 991, a power management module 995, a battery 996, an indicator 997, and a motor 998.

The AP 910 may control a plurality of hardware or software components connected to the AP 910 and also may perform various data processing and operations by executing an OS or an application program. The AP 910 may be implemented with an SoC, for example.

According to an embodiment of the present disclosure, the AP 910 may further include a graphic processing unit (GPU) (not shown) and/or an image signal processor (ISP). The AP 910 may include at least part (e.g., the cellular module 921) of components shown in FIG. 9. The AP 910 may load commands or data received from at least one of other components (e.g., nonvolatile memory) and process them and may store various data in a nonvolatile memory.

The communication module 920 may have the same or similar configuration to the communication interface 370 of FIG. 3. The communication module 920 may include a cellular module 921, a WiFi module 923, a Bluetooth (BT) module 925, a GPS module 927, a near field communication (NFC) module 928, and a RF module 929.

The cellular module 921, for example, may provide voice call, video call, text service, or internet service through communication network.

According to an embodiment of the present disclosure, the cellular module 921 may perform a distinction and authentication operation on the electronic device 901 in a communication network by using a SIM (e.g., the SIM card 924).

According to an embodiment of the present disclosure, the cellular module 921 may perform at least part of a function that the AP 910 provides.

According to an embodiment of the present disclosure, the cellular module 921 may further include a CP.

Each of the WiFi module 923, the BT module 925, the GPS module 927, and the NFC module 928 may include a processor for processing data transmitted/received through a corresponding module.

According to an embodiment of the present disclosure, at least part (e.g., at least one) of the cellular module 921, the WiFi module 923, the BT module 925, the GPS module 927, and the NFC module 928 may be included in one integrated chip (IC) or IC package.

The RF module 929, for example, may transmit/receive communication signals (e.g., RF signals). The RF module 929, for example, may include a transceiver, a power amp module (PAM), a frequency filter, an LNA, or an antenna.

According to another embodiment of the present disclosure, at least one of the cellular module 921, the WiFi module 923, the BT module 925, the GPS module 927, and the NFC module 928 may transmit/receive RF signals through a separate RF module.

The SIM card 924 may include a card including a SIM and/or an embedded SIM and also may include unique identification information (e.g., an integrated circuit card identifier (ICCID)) or subscriber information (e.g., an international mobile subscriber identity (IMSI)).

The memory 930 (e.g., the memory 330) may include an internal memory 932 or an external memory 934. The internal memory 932 may include at least one of a volatile memory (e.g., a dynamic random access memory (DRAM), a static RAM (SRAM), a synchronous dynamic RAM (SDRAM)) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory).

The external memory 934 may further include a flash drive, for example, compact flash (CF), secure digital (SD), micro-SD, Mini-SD, extreme digital (xD), or a memory-stick. The external memory 934 may be functionally and/or physically connected to the electronic device 901 through various interfaces.

The sensor module 940 measures physical quantities or detects an operating state of the electronic device 901, thereby converting the measured or detected information into electrical signals. The sensor module 940 may include at least one of a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (e.g., a red, green, blue (RGB) sensor), a biometric sensor 940I, a temperature/humidity sensor 940J, an illumination sensor 940K, and an ultraviolet (UV) sensor 940M. Additionally or alternatively, the sensor module 940 may include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 940 may further include a control circuit for controlling at least one sensor therein.

According to an embodiment of the present disclosure, the electronic device 901 may further include a processor configured to control the sensor module 940 as part of or separately from the AP 910 and thus may control the sensor module 940 while the AP 910 is in a sleep state.

The input device 950 may include a touch panel 952, a (digital) pen sensor 954, a key 956, or an ultrasonic input device 958. The touch panel 952 may use at least one of capacitive, resistive, infrared, or ultrasonic methods, for example. Additionally, the touch panel 952 may further include a control circuit. The touch panel 952 may further include a tactile layer to provide tactile response to a user.

The (digital) pen sensor 954, for example, may include a sheet for recognition as part of a touch panel or a separate sheet for recognition. The key 956 may include a physical button, an optical key, or a keypad, for example. The ultrasonic input device 958 may check data by detecting sound waves through a microphone (e.g., a microphone 988) in the electronic device 901 through an input tool generating ultrasonic signals.

The display 960 (e.g., the display 360) may include a panel 962, a hologram device 964, or a projector 966. The panel 962 may have the same or similar configuration to the display 360 of FIG. 3. The panel 962 may be implemented to be flexible, transparent, or wearable, for example. The panel 962 and the touch panel 952 may be configured with one module. The hologram 964 may show three-dimensional images in the air by using the interference of light.

The projector 966 may display an image by projecting light on a screen. The screen, for example, may be placed inside or outside the electronic device 901.

According to an embodiment of the present disclosure, the display 960 may further include a control circuit for controlling the panel 962, the hologram device 964, or the projector 966.

The interface 970 may include a HDMI 972, an USB 974, an optical interface 976, or a D-subminiature (sub) 978, for example. The interface 970, for example, may be included in the communication interface 370 shown in FIG. 3. Additionally or alternately, the interface 970 may include a mobile high-definition link (MHL) interface, an SD card/multi-media card (MMC) interface, or an infrared data association (IrDA) standard interface.

The audio module 980 may convert sound into electrical signals and convert electrical signals into sounds. At least some components of the audio module 980, for example, may be included in the input/output interface 350 shown in FIG. 3. The audio module 980 may process sound information inputted/outputted through a speaker 982, a receiver 984, an earphone 986, or a microphone 988.

The camera module 991, as a device for capturing a still image and a video, may include at least one image sensor (e.g., a front sensor or a rear sensor), a lens (not shown), an ISP (not shown), or a flash (not shown) (e.g., an LED or a xenon lamp).

The power management module 995 may manage the power of the electronic device 901.

According to an embodiment of the present disclosure, the power management module 995 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 996, or a voltage, current, or temperature thereof during charging. The battery 996, for example, may include a rechargeable battery and/or a solar battery.

The indicator 997 may display a specific state of the electronic device 901 or part thereof (e.g. the AP 910), for example, a booting state, a message state, or a charging state. The motor 998 may convert electrical signals into mechanical vibration and may generate vibration or haptic effect. Although not shown in the drawings, the electronic device 901 may include a processing device (e.g., a GPU) for mobile TV support. A processing device for mobile TV support may process media data according to the standards such as digital multimedia broadcasting (DMB), digital video broadcasting (DVB), or mediaFLO.

Each of the above-mentioned components of the electronic device according to various embodiments of the present disclosure may be configured with at least one component and the name of a corresponding component may vary according to the kind of an electronic device.

According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 10:
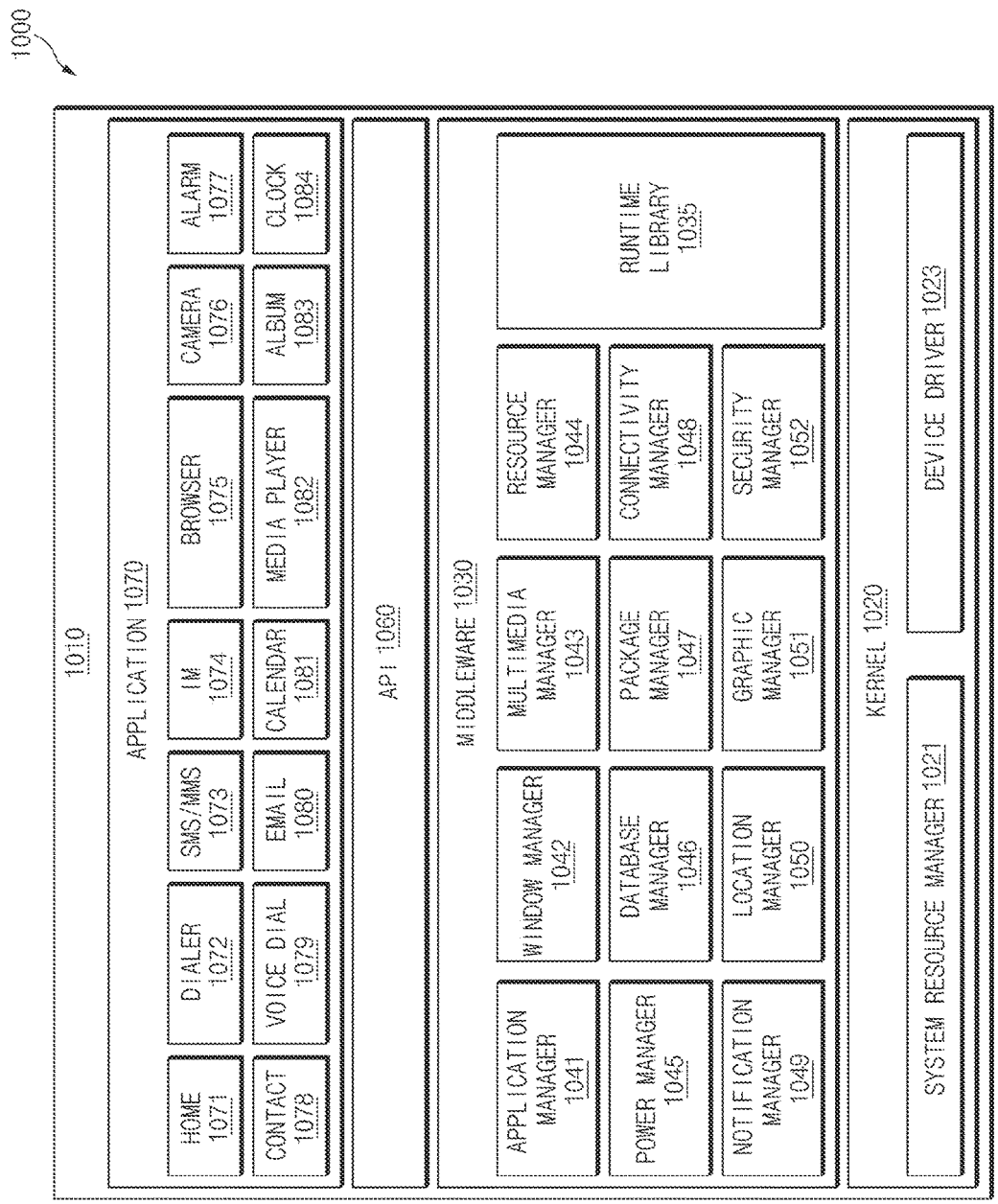
FIG. 10 is a block diagram of a program module according to various embodiments of the present disclosure.

FIG. 10 is a block diagram of a program module according to various embodiments of the present disclosure.

Referring to FIG. 10, according to an embodiment, a program module 1010 (e.g., the program 340) may include an OS for controlling a resource relating to an electronic device (e.g., the electronic device 301) and/or various applications (e.g., the application program 347) running on the OS. The OS, for example, may include android, iOS, windows, symbian, tizen, or bada.

The program module 1010 may include a kernel 1020, a middleware 1030, an API 1060, and/or an application 1070. At least part of the program module 1010 may be preloaded on an electronic device or may be downloaded from a server (e.g., the server 106).

The kernel 1020 (e.g., the kernel 341 of FIG. 3), for example, may include a system resource manager 1021, or a device driver 1023. The system resource manager 1021 may perform the control, allocation, or retrieval of a system resource.

According to an embodiment of the disclosure, the system resource manager 1021 may include a process management unit, a memory management unit, or a file system management unit. The device driver 1023, for example, a display driver, a camera driver, a Bluetooth driver, a sharing memory driver, a USB driver, a keypad driver, a WiFi driver, an audio driver, or an inter-process communication (IPC) driver.

The middleware 1030, for example, may provide a function that the application 1070 requires commonly, or may provide various functions to the application 1070 through the API 1060 in order to allow the application 1070 to efficiently use a limited system resource inside the electronic device.

According to an embodiment of the disclosure, the middleware 1030 (e.g., the middleware 343) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, and a security manager 1052.

The runtime library 1035, for example, may include a library module that a compiler uses to add a new function through a programming language while the application 1070 is running. The runtime library 1035 may perform a function on input/output management, memory management, or an arithmetic function.

The application manager 1041, for example, may mange the life cycle of at least one application among the applications 1070. The window manager 1042 may manage a graphical user interface (GUI) resource used in a screen. The multimedia manager 1043 may recognize a format for playing various media files and may encode or decode a media file by using the codec corresponding to a corresponding format. The resource manager 1044 may manage a resource such as a source code, a memory, or a storage space of at least any one of the applications 1070.

The power manager 1045, for example, may operate together with a basic input/output system (BIOS) to manage the battery or power and may provide power information necessary for an operation of the electronic device. The database manager 1046 may create, search, or modify a database used in at least one application among the applications 1070. The package manager 1047 may manage the installation or update of an application distributed in a package file format.

The connectivity manger 1048 may manage a wireless connection such as WiFi or BT. The notification manager 1049 may display or notify an event such as arrival messages, appointments, and proximity alerts. The location manager 1050 may manage location information on an electronic device. The graphic manager 1051 may manage a graphic effect to be provided to a user or a user interface relating thereto. The security manager 1052 may provide various security functions necessary for system security or user authentication.

According to an embodiment of the present disclosure, when an electronic device (e.g., the electronic device 301) includes a phone function, the middleware 1030 may further include a telephony manager for managing a voice or video call function of the electronic device.

The middleware 1030 may include a middleware module for forming a combination of various functions of the above-mentioned components. The middleware 1030 may provide a module specialized for each type of OS to provide differentiated functions. Additionally, the middleware 1030 may delete part of existing components or add new components dynamically.

The API 1060 (e.g., the API 345), for example, as a set of API programming functions, may be provided as another configuration according to OS. For example, in the case of android or iOS, one API set may be provided for each platform and in the case Tizen, at least two API sets may be provided for each platform.

The application 1070 (e.g., the application program 347), for example, may include at least one application for providing functions such as a home 1071, a dialer 1072, a short message service (SMS)/multimedia messaging service (MMS) 1073, an instant message 1074, a browser 1075, a camera 1076, an alarm 1077, a contact 1078, a voice dial 1079, an e-mail 1080, a calendar 1081, a media player 1082, an album 1083, a clock 1084, health care (e.g., measure an exercise amount or blood sugar), or environmental information provision (e.g., provide air pressure, humidity, or temperature information).

According to an embodiment of the present disclosure, the application 1070 may include an application (hereinafter referred to as "information exchange application") for supporting information exchange between the electronic device (e.g., the electronic device 301) and an external electronic device (e.g., the external electronic device 302 or 304). The information exchange application, for example, may include a notification relay application for relaying specific information to the external device or a device management application for managing the external electronic device.

For example, the notification relay application may have a function for relaying to an external electronic device (e.g., the external electronic device 302 or 304) notification information occurring from another application (e.g., an SMS/MMS application, an e-mail application, a health care application, or an environmental information application) of the electronic device. Additionally, the notification relay application may receive notification information from an external electronic device and may then provide the received notification information to a user. The device management application, for example, may manage (e.g., install, delete, or update) at least one function (turn-on/turn off of the external electronic device itself (or some components) or the brightness (or resolution) adjustment of a display) of an external electronic device (e.g., the external electronic device 304)

communicating with the electronic device, an application operating in the external electronic device, or a service (e.g., call service or message service) provided from the external device.

According to an embodiment of the present disclosure, the application 1070 may include a specified application (e.g., a health care application) according to the property (e.g., as the property of an electronic device, when the type of the electronic device is a mobile medical device) of the external electronic device (e.g., the external electronic device 302 or 304).

According to an embodiment of the present disclosure, the application 1070 may include an application received from an external electronic device (e.g., the server 306 or the external electronic device 302 or 304).

According to an embodiment of the disclosure, the application 1070 may include a preloaded application or a third party application downloadable from a server. The names of components in the program module 1010 according to the shown embodiment may vary depending on the type of OS.

According to various embodiments of the present disclosure, at least part of the program module 1010 may be implemented with software, firmware, hardware, or a combination thereof. At least part of the programming module 1010, for example, may be implemented (e.g., executed) by a processor (e.g., the AP 910). At least part of the programming module 1010 may include a module, a program, a routine, sets of instructions, or a process to perform at least one function, for example.

An electronic device supporting a plurality of networks according to various embodiments of the present disclosure may include a first communication module configured to receive a measurement message for a second network from a first network and a second communication module configured to provide information on the second network to the first communication module in response to the message provided from the first communication module. In this case, the first communication module may report the information to the first network.

According to various embodiments of the present disclosure, the information on the second network may include information on a serving cell and a neighbor cell that the second communication module retains, or information on a frequency band of the second network and information on a plurality of cells.

According to various embodiments of the present disclosure, the second communication module, when having the information on the second network in advance, may provide the information to the first communication module, and when having no information on the second network, may measure the information on the second network. Additionally, when the second communication module does not obtain the information on the second network according to the measurement result, the first communication module may measure the information on the second network through a gap measurement method.

According to various embodiments of the present disclosure, the second communication module may provide only information reportable to the first network to the first communication module by comparing the message provided from the first communication module and the information on the second network. Additionally, if there is no information reportable to the first network according to the comparison result, the second communication module may measure the information on the second network.

According to various embodiments of the present disclosure, when a handover to the second communication module is completed, the first communication module may transmit a data service request message to the first network and resume the data service on the basis of a response for the request message.

According to various embodiments of the present disclosure, the first communication module and the second communication module may be respectively connected to a first RF module and a second RF module connected to at least one antenna.

According to various embodiments of the present disclosure, during handover, handover time and efficiency may be improved by using information that a second stack retains in advance without performing cell search by using a first stack.

Additionally, according to various embodiments of the present disclosure, while VoLTE call service is used in an LTE network, even if the electronic device is handed over to the CS call service, data service of an LTE network may be used.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (e.g., modules or functions thereof) or a method (e.g., operations) according to this disclosure, for example, as in a form of a programming module, may be implemented using an instruction stored in computer-readable storage media. When at least one processor (e.g., the processor 120) executes an instruction, the processor may perform a function corresponding to the instruction. The non-transitory computer-readable storage media may include the memory 330, for example.

The non-transitory computer-readable storage media may include hard disks, floppy disks, magnetic media (e.g., magnetic tape), optical media (e.g., compact disc (CD)-ROM, and DVD), magneto-optical media (e.g., floptical disk), and hardware devices (e.g., ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device, the method comprising:
   receiving, by a first communication module supporting a first network, a measurement message for a second network;
   providing the measurement message to a second communication module supporting the second network;
   providing, by the second communication module, information on the second network to the first communication module in response to the measurement message;
   reporting, by the first communication module, the information to the first network to cause the electronic device to handover a communication to the second network; and
   during the communication with the second network, transmitting a message to the first network to resume a data service.

2. The method of claim 1, wherein the first network is a packet-switched (PS) network and the second network is a circuit-switched (CS) network.

3. The method of claim 1, wherein the providing of the information on the second network comprises:
   providing, when the second communication module has the information on the second network, the information to the first communication module; and
   measuring, by the second communication module, when the second communication module does not have the information on the second network, the information on the second network.

4. The method of claim 3, further comprising measuring, by the first communication module, when the second communication module does not have the information on the second network, the information on the second network through a gap measurement method.

5. The method of claim 1, further comprising:
   receiving a response to the message; and
   resuming the data service based on the response.

6. The method of claim 5, wherein the transmitting of the message is performed when the electronic device is in an area supporting long-term evolution (LTE) but not supporting voice over LTE (VoLTE).

7. The method of claim 5, wherein the transmitting of the message is performed when the electronic device is in an area where voice over long-term evolution) VoLTE is supported but VoLTE is currently unavailable.

8. The method of claim 5, wherein the transmitting of the message is performed, when the electronic device enters from a circuit switched (CS) area to an LTE area, when the electronic device confirms that single radio voice call continuity (SRVCC) is completed in the first network, or when a specified time elapses after the electronic device confirms that the SRVCC is completed.

9. An electronic device supporting a plurality of networks, the electronic device comprising:
   a first communication module configured to receive a measurement message for a second network from a first network; and
   a second communication module configured to provide information on the second network to the first communication module in response to the measurement message provided from the first communication module,
   wherein the first communication module is further configured to:
      report the information to the first network to cause the electronic device to handover a communication to the second network, and
      during the communication with the second network, transmit a message to the first network to resume a data service.

10. The electronic device of claim 9, wherein the information on the second network comprises information on a serving cell and a neighbor cell that the second communication module retains.

11. The electronic device of claim 10, wherein the information on the second network further comprises network information satisfying a frequency band and signal intensity condition of inter-radio access technologies included in a request message.

12. The electronic device of claim 9, wherein the information on the second network comprises information on a frequency band of the second network.

13. The electronic device of claim 9, wherein the second communication module is further configured to:
   provide, when having the information on the second network, the information to the first communication module, and
   measure, when having no information on the second network, the information on the second network.

14. The electronic device of claim 13, wherein, when the second communication module does not obtain the information on the second network according to the measurement result, the first communication module is further configured to measure the information on the second network through a gap measurement method.

15. The electronic device of claim 9, wherein the second communication module is further configured to provide only information reportable to the first network to the first communication module by comparing the measurement message provided from the first communication module and the information on the second network.

16. The electronic device of claim 15, wherein, if there is no information reportable to the first network according to the comparison result, the second communication module is further configured to measure the information on the second network.

17. The electronic device of claim 9, wherein the first communication module is further configured to:
   resume the data service based on a response to the message.

18. The electronic device of claim 9, wherein the first communication module and the second communication module are respectively connected to a first radio frequency (RF) module and a second RF module connected to at least one antenna.

19. A method of an electronic device using a call service through a call session formed in a first stack, the method comprising:

receiving, by the first stack, a second generation (2G) or third generation (3G) network information request message from a long-term evolution (LTE) network;

delivering the request message to a second stack;

providing, by the second stack, the 2G or 3G network information to the first stack;

handing over the LTE network to the 2G or 3G network;

moving the call session from the first stack to the second stack; and during the call session using the second stack, transmitting a message to the first network to resume a data service.

20. The method of claim 19, wherein the providing of the 2G or 3G network information comprises:

providing, when the second stack has information on a 2G network or a 3G network in advance, the information to the first stack; and measuring, by the second stack, when the second stack does not have information on the 2G network or the 3G network, the information on the 2G network or the 3G network.

21. The method of claim 19, further comprising:

resuming the data service based on a response to the message.

* * * * *